United States Patent
Kunita (10) Patent No.: US 7,535,516 B2
(45) Date of Patent: May 19, 2009

(54) DATA REPRODUCTION APPARATUS REDUCING POWER CONSUMPTION OF EQUIPMENT REPRODUCING VIDEO IMAGE AND METHOD OF CONTROLLING THE SAME

(75) Inventor: Yoshiyuki Kunita, Daito (JP)

(73) Assignee: Funai Electric Co., Ltd., Daito-shi, Osaka (JP)

( * ) Notice: Subject to any disclaimer, the term of this patent is extended or adjusted under 35 U.S.C. 154(b) by 808 days.

(21) Appl. No.: 11/152,998

(22) Filed: Jun. 15, 2005

(65) Prior Publication Data

US 2006/0001662 A1 Jan. 5, 2006

(30) Foreign Application Priority Data

Jun. 16, 2004 (JP) ............................. 2004-178504

(51) Int. Cl.
*H04N 5/57* (2006.01)
(52) U.S. Cl. ....................... 348/687; 348/673; 345/212; 386/68
(58) Field of Classification Search ................. 348/687, 348/673, 678, 730, 738, 736, 372, 380; 345/211, 345/212, 214; 382/274; 386/46, 68, 113, 386/123, 14, 79
See application file for complete search history.

(56) References Cited

U.S. PATENT DOCUMENTS 7,376,331 B2 * 5/2008 Cheng ......................... 386/46
2001/0040568 A1 * 11/2001 Park ............................ 345/211

FOREIGN PATENT DOCUMENTS

| JP | 8-87823 | 4/1996 |
|----|---------|--------|
| JP | 08-322017 | 12/1996 |
| JP | 9-266555 | 10/1997 |
| JP | 11-004390 | 1/1999 |
| JP | 2000-165789 | 6/2000 |
| JP | 2002-51243 | 2/2002 |

OTHER PUBLICATIONS

Patent Abstracts of Japan, Publication No. 08-322017, Publication Date: Dec. 3, 1996, 1 page.
Patent Abstracts of Japan, Publication No. 11-004390, Publication Date: Jan. 6, 1999, 1 page.
Japanese Office Action for Japanese Application No. 2004-178504, mailed on May 7, 2008 (9 pages).
Patent Abstracts of Japan for Japanese Publication No. 08-087823, Publication date Apr. 2, 1996 (1 page).
Patent Abstracts of Japan for Japanese Publication No. 09-266555, Publication date Oct. 7, 1997 (1 page).
Patent Abstracts of Japan for Japanese Publication No. 2002-051243, Publication date Feb. 15, 2002 (1 page).
Patent Abstracts of Japan for Japanese Publication No. 2000-165789, Publication date Jun. 16, 2000 (1 page).

* cited by examiner

*Primary Examiner*—David L Ometz
*Assistant Examiner*—Jean W Désir
(74) *Attorney, Agent, or Firm*—Osha • Liang LLP (57) ABSTRACT

There is provided a data reproduction apparatus reproducing an image and sound as based on data recorded in a storage medium. In the apparatus if an input device has received predetermined information and data selected to be reproduced is data excluding image data an image reproduction device is controlled to have a lower level of brightness for reproducing an image than when data including image data is reproduced.

10 Claims, 9 Drawing Sheets

DATA REPRODUCTION APPARATUS REDUCING POWER CONSUMPTION OF EQUIPMENT REPRODUCING VIDEO IMAGE AND METHOD OF CONTROLLING THE SAME

BACKGROUND OF THE INVENTION

1. Field of the Invention

The present invention relates to data reproduction apparatus and particularly to such apparatus capable of reproducing data including image data and/or audio data and methods of controlling the same.

2. Description of the Background Art

Conventionally when a data reproduction apparatus performs a reproduction operation corresponding to a storage medium having video image data recorded therein a monitor is prevented by a technique from burning, as disclosed for example in Japanese Patent Laying-Open No. 8-322017. This document discloses that when a video image associated with particular video image data is continuously output and displayed for more than a predetermined period of time a video image signal output associated with the video image data has its level in luminance reduced.

Furthermore in such a data reproduction apparatus when a monitor is outputting a video image that the user would consider is not important the monitor receives a signal devised by a technique, as disclosed in Japanese Patent Laying-Open No. 11-4390. This document discloses that if a digital versatile disk (DVD) integrated television receiver capable of reproducing DVDs and compact discs (CDs) continues to reproduce a CD for more than a preset period of time the screen's video image adjustment value is decreased.

If such a conventional data reproduction apparatus as described above is reproducing a music from a CD, i.e., video image data output is generally not considered important by a user, the user may nonetheless desire to continue to display a still image intentionally (for example for ornamental purposes). In such a case the above described conventional technology would nonetheless decrease a level in luminance of a video image signal output of video image data or decrease the video image adjustment value after a predetermined period of time elapses.

On the other hand, such a conventional data reproduction apparatus as described above can advantageously prevent a monitor from burning and also contribute to reduced power consumption of the monitor or similar equipment involved in reproduction.

SUMMARY OF THE INVENTION

The present invention has been made to address such circumstances and it contemplates a data reproduction apparatus capable of reducing power consumption of equipment involved in reproducing video image data, as desired by a user, and a method of controlling the same.

The present invention in one aspect provides a data reproduction apparatus reproducing an image and sound as based on data recorded in a storage medium, including: an input device receiving external information; a data selector selecting data to be reproduced from the data recorded in the storage medium; a determiner determining from an extension of the data selected by the data selector whether the data selected by the data selector is data excluding image data; a reproducer reproducing an image based on the data selected by the data selector; and a controller capable of controlling the reproducer in brightness for reproducing an image. When the input device has received predetermined information and the determiner determines that the data selected by the data selector is data excluding image data, the controller controls the reproducer to decrease its brightness for reproducing an image to be lower than when the determiner determines that the data selected by the data selector is data including image data. When the input device receives predetermined information the determiner determines whether the data selected by the data selector is data excluding image data. The controller depends on a frequency of reception of predetermined information by the input device to control the reproducer to gradually decrease its brightness for reproducing an image.

The present invention in another aspect provides a data reproduction apparatus reproducing an image and sound as based on data recorded in a storage medium, including: an input device receiving external information; a data selector selecting data to be reproduced from the data recorded in the storage medium; a determiner determining from an extension of the data selected by the data selector whether the data selected by the data selector is data excluding image data; a reproducer reproducing an image based on the data selected by the data selector; a controller capable of controlling the reproducer in brightness for reproducing an image; and a storage storing information indicating whether the input device has received the predetermined information, and extent information indicating an extent of brightness reduced in the reproducer reproducing an image. When the data selector has selected data to be reproduced the determiner responsively determines whether the data selected by the data selector is data excluding image data. When the input device has received the predetermined information and the determiner also determines that the data selected by the data selector is data excluding image data the controller controls the reproducer to decrease its brightness for reproducing an image to be lower by an extent based on the extent information than when the determiner determines that the data selected by the data selector is data including image data.

The present invention in still another aspect provides a data reproduction apparatus reproducing an image and sound as based on data recorded in a storage medium, including: an input device receiving external information; a data selector selecting data to be reproduced from the data recorded in the storage medium; a determiner determining from an extension of the data selected by the data selector whether the data selected by the data selector is data excluding image data; a reproducer reproducing an image based on the data selected by the data selector; and a controller capable of controlling the reproducer for reproducing an image. When the input device has received predetermined information and the determiner determines that the data selected by the data selector is data excluding image data, the controller controls the reproducer to stop outputting an image.

The present invention in still another aspect provides a data reproduction apparatus reproducing an image and sound as based on data recorded in a storage medium, including: an input device receiving external information; a data selector selecting data to be reproduced from the data recorded in the storage medium; a determiner determining whether the data selected by the data selector is data excluding image data; and a controller capable of controlling in brightness an image reproduction device reproducing an image based on the data selected by the data selector. When the input device has received predetermined information and the determiner determines that the data selected by the data selector is data excluding image data, the controller controls the image reproduction device to decrease its brightness for reproducing the image to be lower than when the determiner determines that the data selected by the data selector is data including image data.

The present invention in still another aspect provides a data reproduction apparatus reproducing an image and sound as based on data recorded in a storage medium, including: an input device receiving external information; a data selector selecting data to be reproduced from the data recorded in the storage medium; a determiner determining whether the data selected by the data selector is data excluding image data; and a controller capable of controlling an image reproduction device for reproducing an image based on the data selected by the data selector. When the input device has received predetermined information and the determiner determines that the data selected by the data selector is data excluding image data, the controller controls the image reproduction device to stop outputting an image.

The present invention in one aspect provides a method of controlling a data reproduction apparatus reproducing an image and sound based on data recorded in a storage medium, including the steps of: receiving external information; selecting data to be reproduced from the data recorded in the storage medium; determining whether the data selected to be reproduced is data excluding image data; and if predetermined information has externally been received and a decision is made that the data selected to be reproduced is data excluding image data, controlling the image reproduction device to have a lower level in brightness for reproducing an image than when a decision is made that the data selected to be reproduced is data including image data.

The present invention in another aspect provides a method of controlling a data reproduction apparatus reproducing an image and sound based on data recorded in a storage medium, including the steps of: receiving external information; selecting data to be reproduced from the data recorded in the storage medium; determining whether the data selected to be reproduced is data excluding image data; and if predetermined information has externally been received and a decision is made that the data selected to be reproduced is data excluding image data, controlling the image reproduction device to stop outputting an image.

If the present data reproduction apparatus reproduces data recorded in a storage medium that does not include image data and predetermined information is also externally received the image reproduction device is controlled to reduce its brightness to be lower than when data including image data is reproduced.

Thus for example when the data reproduction apparatus reproduces music from a CD or in a similar case where outputting an image would in general not be considered important by the user, an image reproduction device is decreased in brightness in response to instruction from the user.

Thus the present data reproduction apparatus can reduce burning of a monitor as well as the monitor's power consumption when the user so desires.

Furthermore in accordance with the present invention whether data to be reproduced is data excluding image data is determined from an extension of the data to be reproduced. This can help the data reproduction apparatus to make such decision.

Furthermore the present data reproduction apparatus will be integrated in configuration with an image reproduction device. In such a type of data reproduction apparatus the image reproduction device is powered on/off as switched in accordance powering on/off the data reproduction apparatus. As such, when the data reproduction apparatus itself is powered on, the image reproduction device is also powered on, and conventionally when such a type of data reproduction apparatus for example reproduces music from a CD or in a similar case where outputting an image would in general not be considered important by the user, it has been difficult to control the image reproduction device alone for example to turn on/off to adjust outputting an image therefrom. In this regard the present invention would particularly be useful.

Furthermore in the present data reproduction apparatus whether data to be reproduced is data excluding image data is determined when the input device receives predetermined information. As such, when a user performs an operation to input the predetermined information to the input device, then, in accordance with the operation's timing, the image reproduction device will be controlled to be reduced in brightness. It can thus be controlled as desired by the user.

Furthermore in the present data reproduction apparatus the image reproduction device can be reduced in brightness gradually in accordance with how frequently the predetermined information has been received. It can thus be controlled as desired by the user.

Furthermore the present data reproduction apparatus can previously receive predetermined information and information of an extent of reduction in brightness so that if data excluding image data is reproduced the image reproduction device can automatically be controlled to be reduced in brightness.

Furthermore if the present data reproduction apparatus reproduces data recorded in a storage medium that does not include image data and predetermined information is also externally received the image reproduction device is controlled to stop outputting an image in contrast to the time when data including image data is reproduced.

Thus for example when the data reproduction apparatus reproduces music from a CD or in a similar case where outputting an image would in general not be considered important by the user, the image reproduction device is controlled in response to instruction received from the user to stop outputting an image.

Thus the present data reproduction apparatus can reduce burning of a monitor as well as the monitor's power consumption when the user so desires.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Hereinafter the present data reproduction apparatus will be described with reference to the drawings.

First Embodiment

Figure 1:
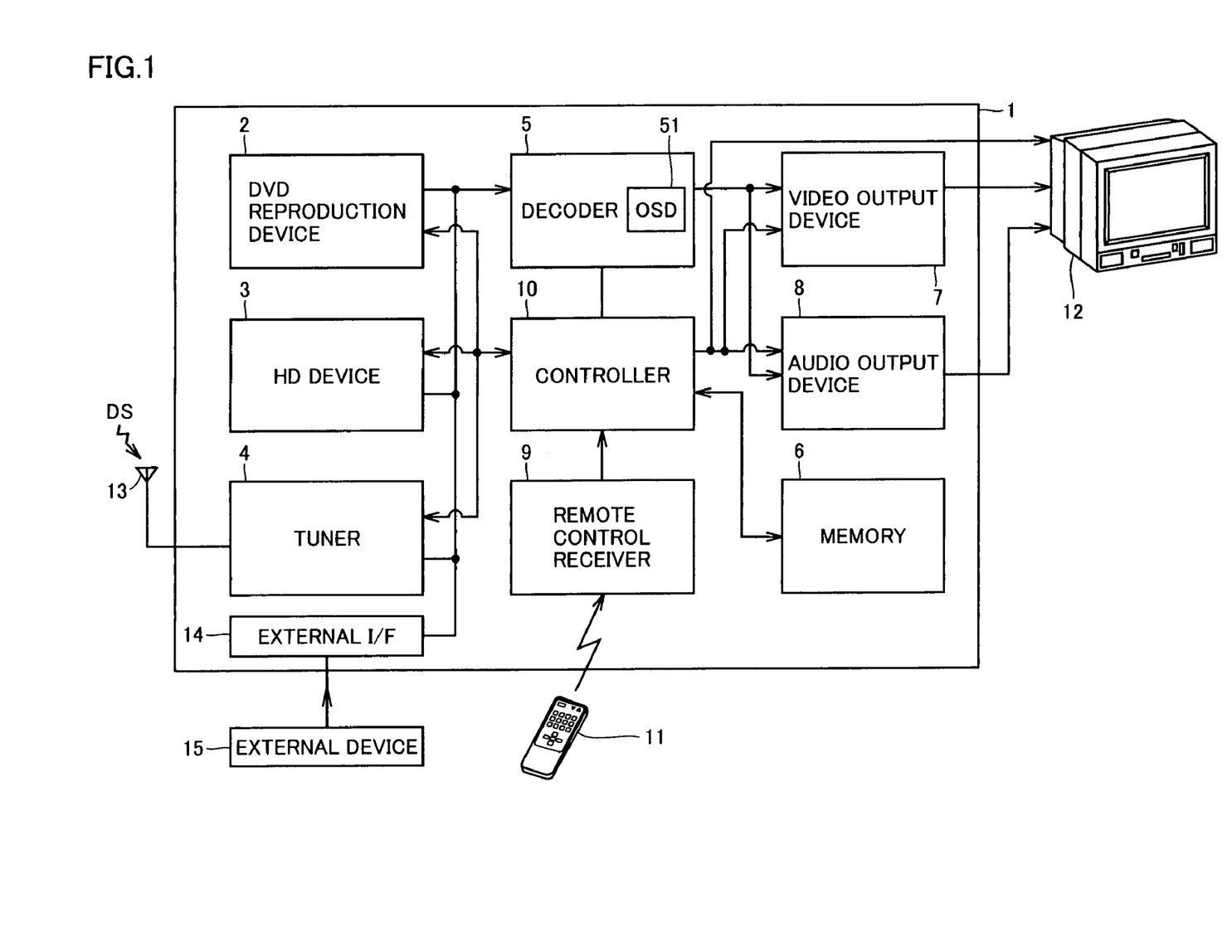
FIG. 1 is a block diagram for illustrating controlling a storage media reproduction apparatus of the present invention in a first embodiment.

With reference to FIG. 1, a storage media reproduction apparatus 1 incorporates a device reproducing data recorded in a plurality of types of digital storage media and outputs contents reproduced from the storage media or similar various supplied contents in a video signal and/or an audio signal to an externally, previously connected monitor device 12. A user can thus visually and audibly enjoy the various contents via monitor device 12.

Storage media reproduction apparatus 1 includes a DVD reproduction device 2, a hard disk (HD) device 3 incorporating a hard disk (not shown) and recording digital information to the hard disk and also reproducing content of the digital information from the hard disk, a tuner 4 having an external antenna 13 connected thereto to receive a digital broadcast signal DS transmitted from a broadcast station, a decoder 5 incorporating an on screen display (OSD) 51, a memory 6, a video output device 7, an audio output device 8, a remote control receiver 9, a controller 10, a remote controller 11, and an external interface (I/F) 14 connecting an external device 15 operating to supply external digital information.

DVD reproduction device 2 reads a signal of digital content recorded on a DVD, a CD or similar optical disc. HD device 3 records to a hard disc a signal of digital content desired by a user and reads the signal of the digital content recorded therein. Herein, the hard disc records signals such as a multimedia file in conformity with Motion Picture Experts Group 2 (MPEG 2) and an audio file in conformity with MPEG-1 Audio Layer 3 (MP3).

When tuner 4 receives via antenna 13 digital broadcast signal DS transmitted from a broadcasting station, tuner 4 extracts and outputs a signal broadcast through a channel designated by controller 10 (i.e., a signal of digital content).

When decoder 5 receives a signal of digital content reproduced by DVD reproduction device 2, a signal of digital content read by HD device 3 from the hard disk, a signal of digital content received by tuner 4, or a signal of digital content received from external device 15 through external I/F 14, as switched as controlled by controller 10, and decodes and outputs the signal.

Decoder 5 incorporates OSD 51, which is driven by information received from controller 10 to generate image data and output the data to video output device 7 which in turn output the data to monitor device 12 to visibly display it on a screen of monitor device 12.

Memory 6 stores an operation program of controller 10, a parameter used when controller 10 effects the operation program, and other, variety of information.

Audio output device 8 receives an audio signal decoded by decoder 5, converts the signal to an audio signal that can be output by monitor device 12, and outputs the converted audio signal to monitor device 12.

Remote control receiver 9 receives a variety of command signals transmitted from remote controller 11 through an infrared ray, and outputs the received signal to controller 10.

Controller 10 controls each component or storage media reproduction apparatus 1 in accordance with the operation program stored in memory 6. Controller 10 can also directly control monitor device 12.

Remote controller 11 is operated by a user to input a variety of commands. Remote controller 11 transmits an infrared signal corresponding to each command.

Figure 2:
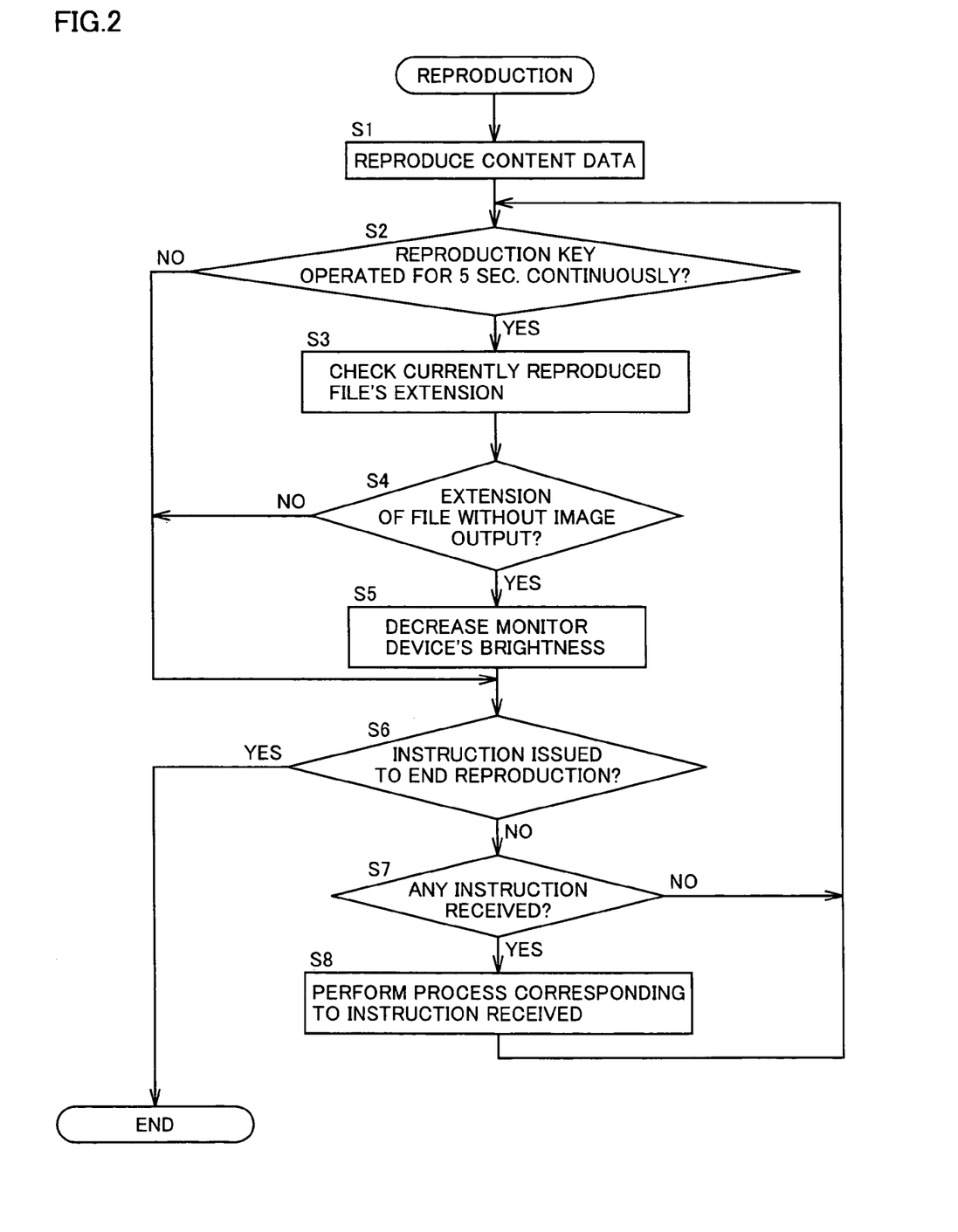
FIG. 2 is a flow chart of a reproduction process effected by the controller shown in FIG. 1.

With reference to FIG. 2, controller 10 performs a reproduction process, as will be described hereinafter. The reproduction process is performed by controller 10 to cause DVD reproduction device 2 or HD device 3 to reproduce a signal of digital content desired by the user. Note that this reproduction process is performed under the condition that remote control receiver 9 has received a signal indicating that content should be reproduced. This signal is transmitted for example by operating a reproduction key of remote controller 11.

When the signal indicating that the content should be reproduced is received, controller 10 goes to step (S) 1 to reproduce the content designated by the signal.

Controller 10 then goes to S2 to determine whether the remote controller 11 reproduction key has been operated (or pressed) continuously for five seconds. More specifically, controller 11 determines whether a signal transmitted by such an operation has been received by remote control receiver 9. If so then controller 10 goes to S3, otherwise it goes to S6.

At S3 controller 10 checks an extension of a file configuring currently reproduced content data and goes to S4.

At S4 controller 10 determines whether the extension of the file checked at S3 is an extension of a file without an image output. More specifically, memory 6 has previously stored therein a list of extensions of files without an image output and controller 10 determines whether the extension of the file checked at S3 matches any extension included in the list of extensions stored in memory 6. Note that the extension list may can have stored therein for example "mp3" (corresponding to MP3), "WMA" (corresponding to an audio compression format of Microsoft®, and the like. If controller 10 determines that the extension of the file checked at S3 is an extension of a file without an image output, controller 10 goes to S5, otherwise it goes to S6.

At S5, controller 10 outputs a signal to monitor device 12 to decrease brightness applied to output an image and goes to S6. Brightness can be decreased for example by an extent of approximately 50%, although it is not limited to such extent.

At S6, controller 10 determines whether an instruction has been issued to terminate reproducing content data. More specifically, controller 10 determines whether remote controller 11 is operated and remote control receiver 9 has thus received such a signal. If controller 10 so determines, it terminates the reproduction process, otherwise it goes to S7.

At S7, controller 10 determines whether there has been any instruction received. More specifically, controller 10 determines whether remote controller 11 has been operated and remote control receiver 9 has thus received any information. If controller 10 so determines then controller 10 goes to S8 to effect a process corresponding to the instruction and then returns to S2. If controller 10 determines that such instruction has not been received, controller 10 simply returns to S2.

In the above described reproduction process when DVD reproduction device 2 or HD device 3 is utilized to reproduce content data and a particular operation that is not normally performed in reproduction (pressing the remote controller 11 reproduction key continuously for five seconds) is also performed, and a currently reproduced file is a file without an image output, then monitor device 12 is controlled to decrease brightness applied to display an image.

More specifically in the present embodiment remote controller 11 having the reproduction key pressed continuously for five seconds transmits to remote control receiver 9 a signal, which corresponds to a prescribed signal, and in response to remote control receiver 9 receiving the prescribed signal, the control proceeds from the FIG. 2 S2 to S3.

Note that such control is attributed not only to the above described particular operation implemented by pressing the reproduction key continuously for five seconds. For example, remote controller 11 may be provided with a key dedicated to performing the particular operation, and in such a case, remote control receiver 9 does not receive a signal corresponding to the fact that the reproduction key has been pressed continuously for five seconds. Rather, remote control receiver 9 receives a signal corresponding to the fact that the dedicated key has been operated, and the control responsively goes from the FIG. 2 S2 to S3.

Note that the above described reproduction process may be adapted such that once monitor device 12 has been decreased in brightness at S5 it will not further be decreased in brightness if the control subsequently goes to S5, or in contrast whenever S5 is performed monitor device 12 may be decreased in brightness gradually until S5 is performed a number of times that is predetermined as an upper limit.

Figure 3:
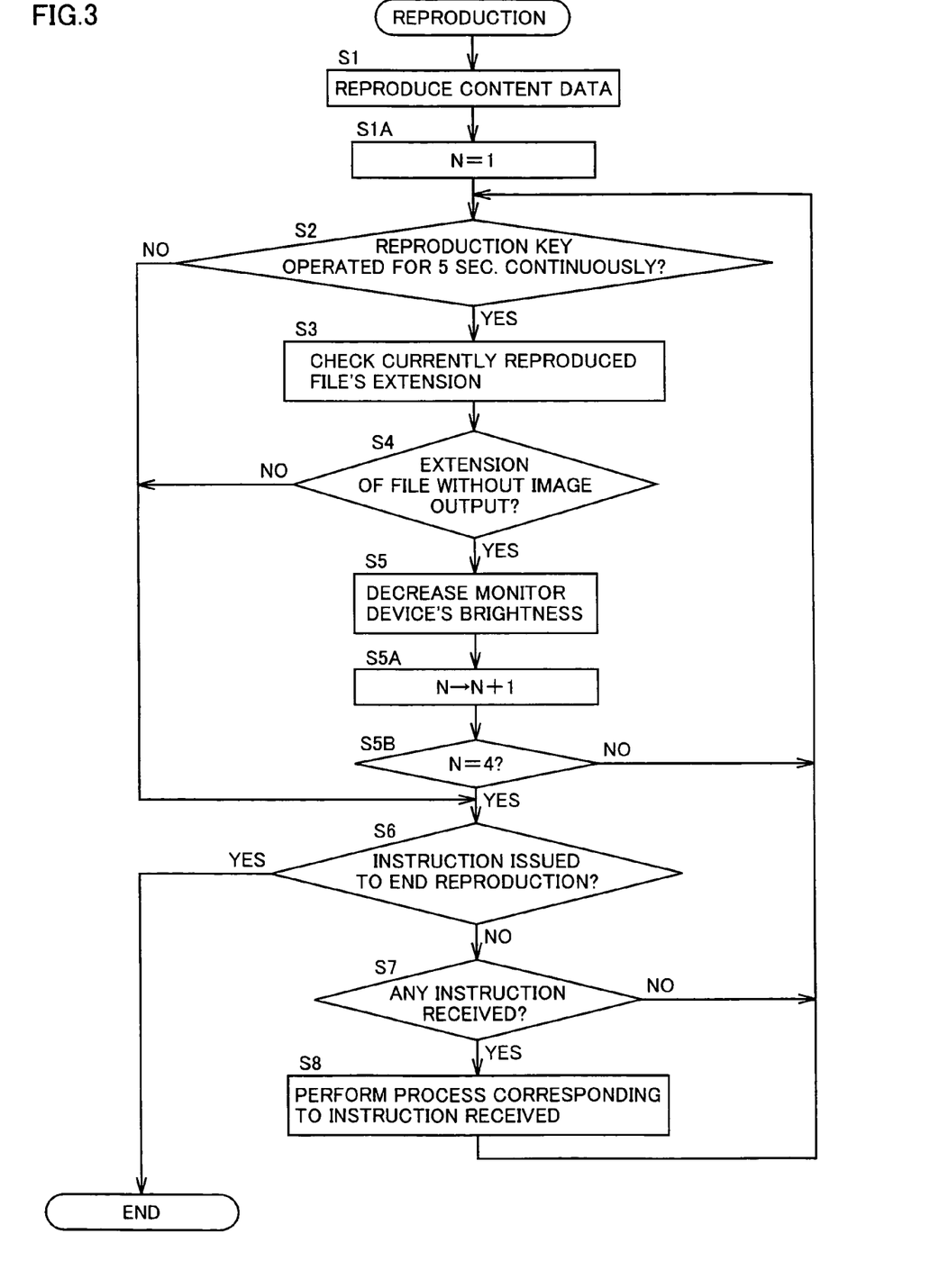
FIG. 3 is a flow chart of an exemplary variation of the FIG. 2 reproduction process.

More specifically, the reproduction process may be modified as shown for example in FIG. 3.

With reference to the figure showing the exemplary variation S5 is performed a number of times, which is counted N. More specifically, at S1, reproducing content's data starts, and subsequently at S1A count N is set to a value of 1 by a process. Furthermore at S5 monitor device 12 has a screen decreased in brightness and subsequently at S5A count N is incremented in value by 1 and thus updated.

Furthermore, until count N reaches a value of 4, S2-S5 and S5A are repeated, and if at S5B a decision is made that count N has reached the value of 4, the control goes to S6 et. seq. More specifically, S5 is performed three times at most. Note that in this exemplary variation when S5 is first performed controller 10 decreases the monitor device 12 screen in brightness to 50% of that set for standby (or 50% of that for reproducing image data). When S5 is secondly performed, the monitor device 12 screen is decreased in brightness to 25% of that set for standby. When S5 is thirdly performed, the monitor device 12 screen is decreased in brightness to 12.5% of that set for standby.

Figure 4:
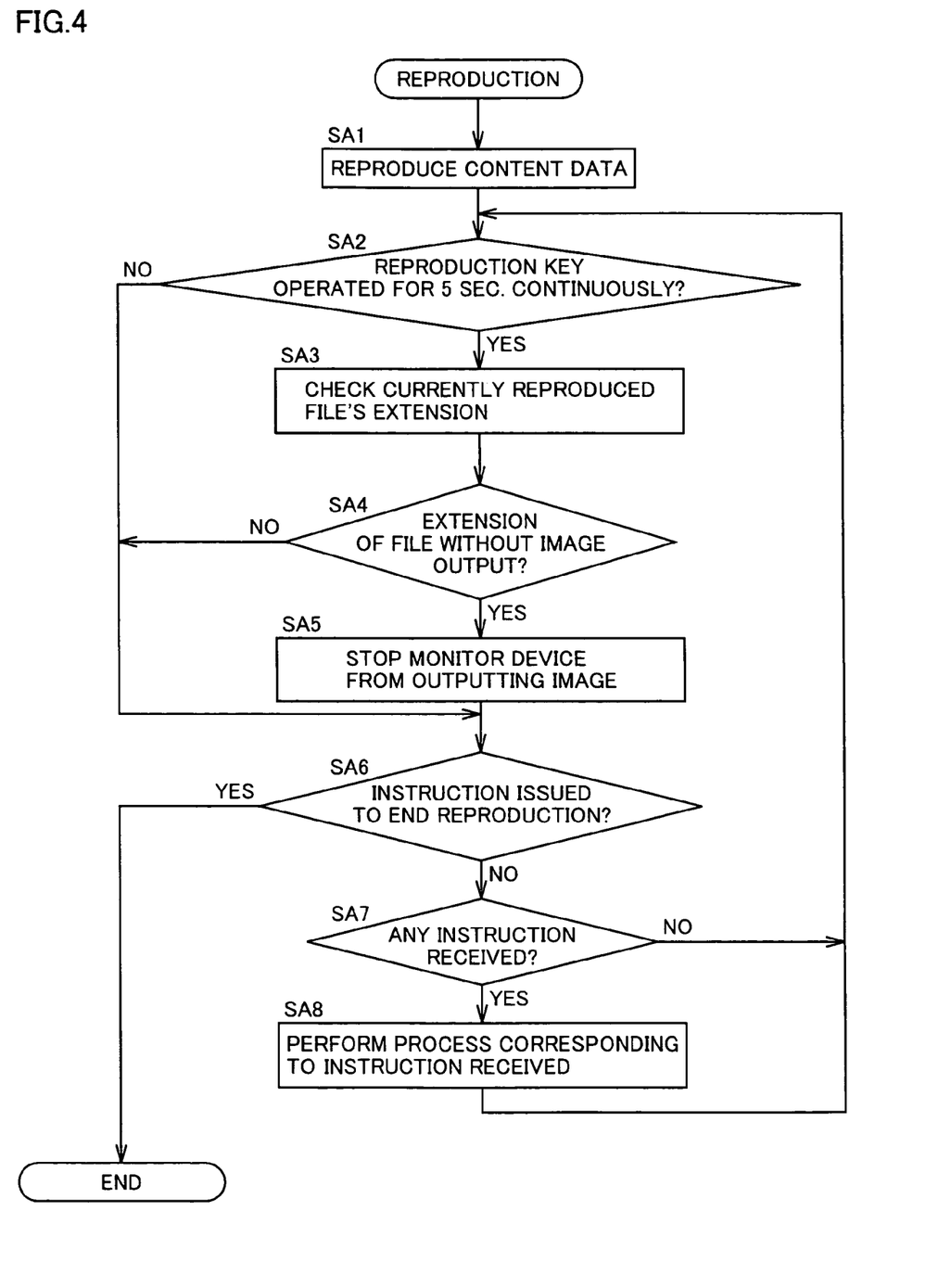
FIG. 4 is a flow chart of another exemplary variation of the FIG. 2 reproduction process.

Furthermore it is also possible to modify the reproduction process described with reference to FIG. 2, as shown in FIG. 4.

With reference to FIG. 4 showing an exemplary variation SA1-SA8 are performed and the steps other than SA5 are identical to the FIG. 2 S1-S4 and S6-S8, respectively.

At SA5 controller 10 controls monitor device 12 to stop outputting an image therefrom.

More specifically in the FIG. 4 exemplary variation when DVD reproduction device 2 or HD device 3 is utilized to reproduce content data and a particular operation is also performed, and a currently reproduced file is a file without an image output, then monitor device 12 is controlled to stop supplying power to an image output circuit.

Furthermore while in the present embodiment storage media reproduction apparatus 1 is connected to an external monitor device 12 outputting an image and sound and exerts control over monitor device 12, storage media reproduction apparatus 1 as an embodiment of the present invention may be configured to include monitor device 12 or similar image and audio output device.

In the above described reproduction process whether currently reproduced data is data excluding image data is determined from data's extension. It may be determined in a different manner. For example, if DVD reproduction device 2 is reproducing data recorded on a disk, the above decision may be made from the configuration of the data on the disk. More specifically, the above decision may be made by determining whether in the disk having the currently reproduced data stored therein the data's structure corresponds to data which does not include compact disk digital audio (CCDA), super audio CD (SACD) or similar image data.

Second Embodiment

Figure 5:
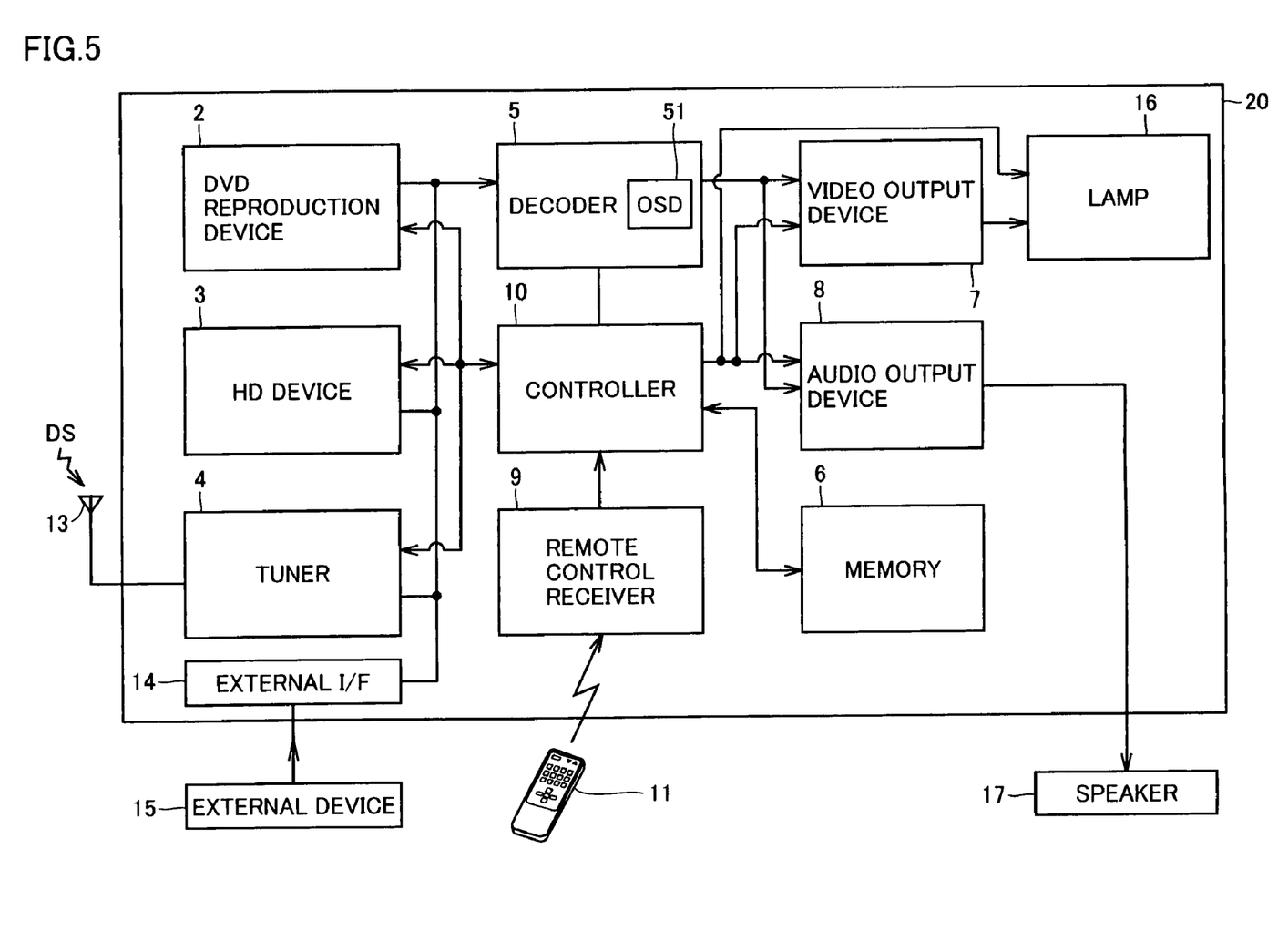
FIG. 5 is a block diagram for illustrating controlling a storage media reproduction projector corresponding to a second embodiment of the present invention.

FIG. 5 shows a storage media reproduction projector 20 corresponding to a second embodiment of the present invention. It basically has a configuration similar to that of storage media reproduction apparatus 1 described in the first embodiment.

Note that the FIG. 5 storage media reproduction projector 20 incorporates a plurality of types of digital storage media reproduction devices and visibly and audibly outputs contents reproduced from storage media and similar, various types of supplied contents by outputting an image signal to an incorporated lamp 16 and an audio signal to an external speaker 17. Lamp 16 outputs an optical image which is projected on a prescribed screen to output an image of the above content, and speaker 17 outputs sound of the above content.

Figure 6:
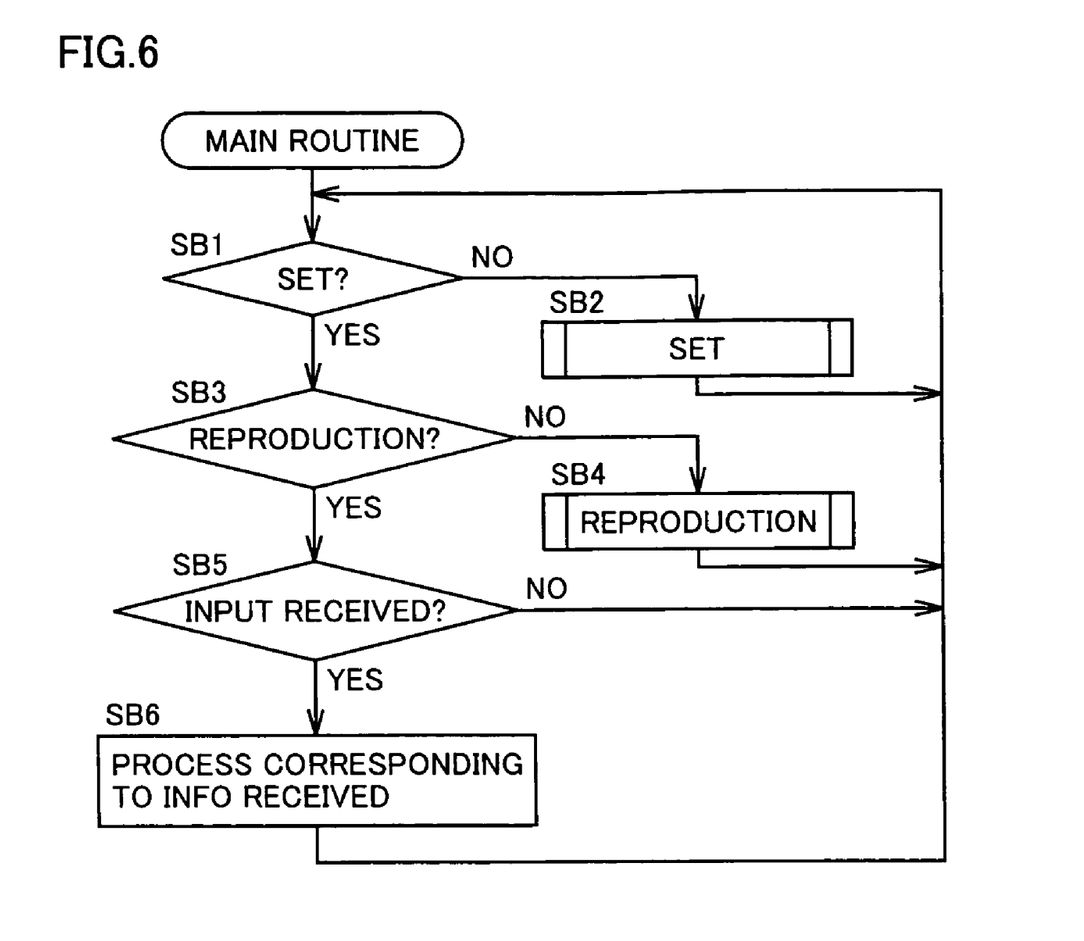
FIG. 6 is a flow chart of a main routine effected by the controller indicated in FIG. 5.

The FIG. 5 storage media reproduction projector 20 includes controller 10 generally controlling projector 20. Reference will now be made to FIG. 6 to specifically describe a main routine executed by controller 10.

With reference to FIG. 6, controller 10 initially goes to SB1 to determine whether information for effecting a variety of settings has been input to projector 20. Such information is input to remote control receiver 9 for example by operating remote controller 11, as prescribed. If controller 10 determines that the information has been input, controller 10 goes to SB2, otherwise it goes to SB3.

At SB2, controller 10 effects a setting process, as will specifically be described later, with respect to a variety of settings to receive information externally input, and then returns to SB1.

At SB3, controller 10 determines whether information has been input to instruct projector 20 to use DVD reproduction device 2 or HD device 3 to reproduce content. Such information is input to remote control receiver 9 for example by operating remote controller 11, as prescribed. If controller 10 determines that such information has been received, it goes to SB4, otherwise it goes to SB5.

At SB4 controller 10 executes a reproduction process corresponding to a process performed to reproduce content, as will specifically be described later, and then returns to SB1.

At SB5 controller 10 determines whether projector 20 has received additional information, and if so then controller 10 goes to SB6 to perform a process corresponding to the information input at SB6 and then returns to SB1, otherwise controller 10 simply returns to SB1.

Figure 7:
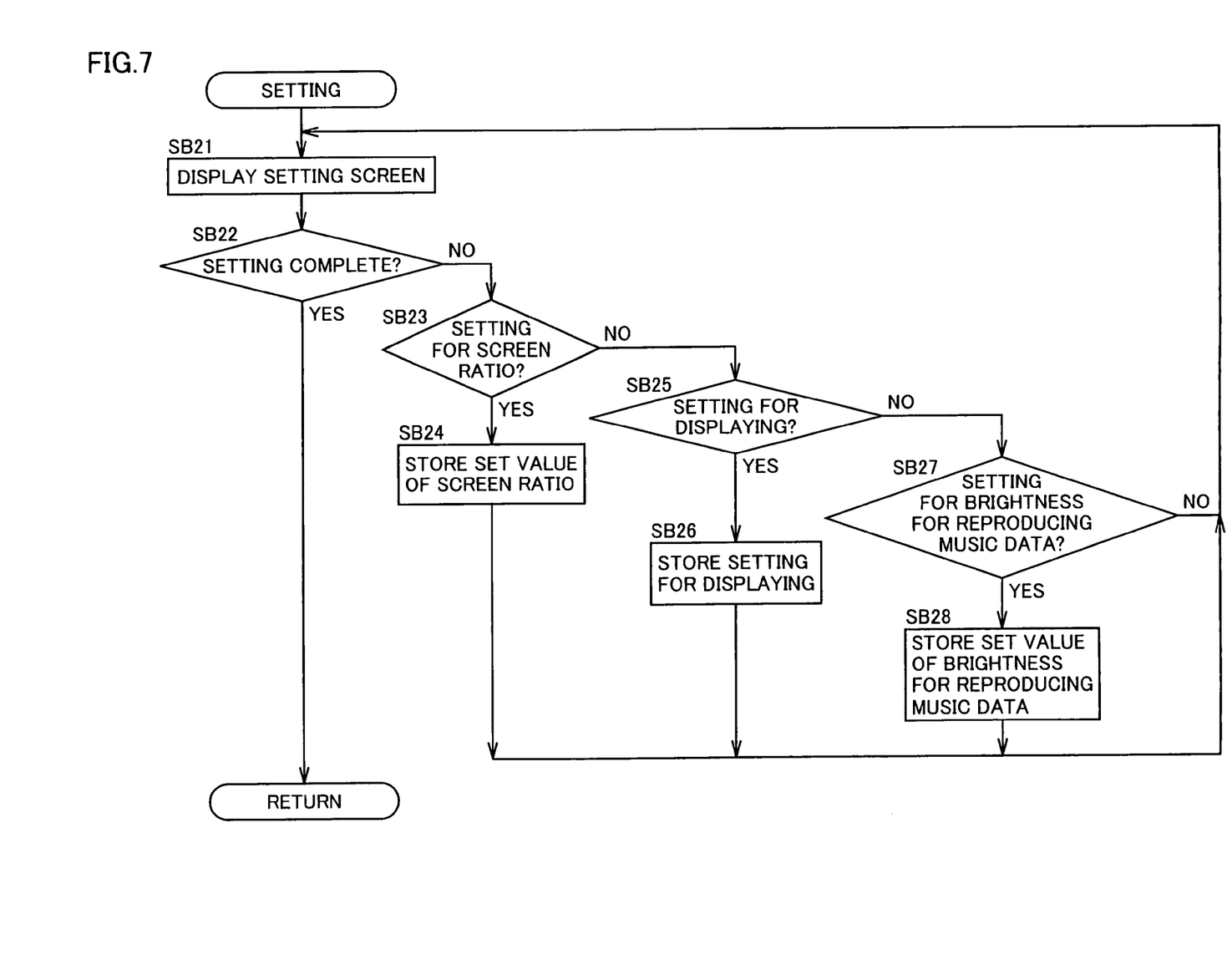
FIG. 7 is a flow chart of a subroutine of the setting process indicated in FIG. 6.

With reference to FIG. 7, the FIG. 6 setting process will more specifically be described.

Figure 8:
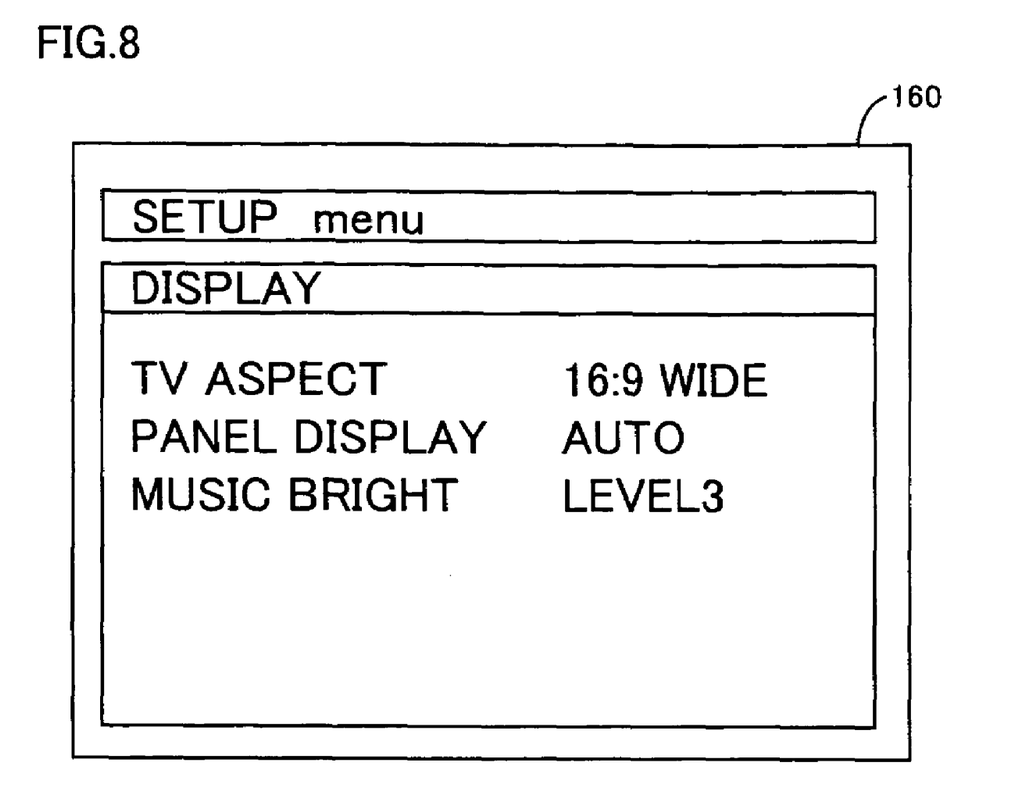
FIG. 8 shows one example of a setting screen displayed on a screen in the FIG. 7 process.

With reference to FIG. 7, the setting process is performed as follows: controller 10 initially at SB21 causes a setting screen as shown in FIG. 8 to be displayed, and goes to SB22.

With reference to FIG. 8, a setting screen 160 is a screen projected by lamp 16 as controller 10 controls video output device 7, as appropriate. Setting screen 160 displays three setting items "TV ASPECT", "PANEL DISPLAY" and "MUSIC BRIGHT" associated with displaying and on the left hand of each item is displayed a current specific setting for the item. The item "TV ASPECT" is a setting item associated with a screen ratio, a ratio of displaying on a screen in horizontal and vertical directions. The item "PANEL DISPLAY" is a basic setting item associated with displaying. The item "MUSIC BRIGHT" is a setting item associated with brightness of a screen projected by lamp 16 in reproducing data configured of audio data alone, i.e., data which does not include image data.

Note that in the present embodiment if data which does not include image data is reproduced, lamp 16 can project a screen set in brightness in five levels 1-5 More specifically, if data including image data is reproduced with lamp 16 projecting a screen at 10% of brightness, levels 5, 4, 3, 2 and 1 are set to correspond to 100%, 70%, 50%, 25%, and 0%.

With reference again to FIG. 7, at SB22 controller 10 determines whether information for completing the setting process has been received via remote control receivers 9, and if so controller 10 returns, otherwise controller 10 goes to SB23.

At SB23 controller 10 determines whether information inputting a setting value for the screen ratio has been received via remote control receiver 9, and if so controller 10 goes to SB24 to receive the value and furthermore stores the value to memory 6, and returns to SB21. If controller 10 determines that such information has not been received, controller 10 goes to SB25.

At SB25 controller 10 determines information inputting a condition for a basic setting associated with displaying, as described above, has been received via remote control receiver 9, and if so controller 10 goes to SB26 to receive the condition and furthermore stores the condition to memory 6, and returns to SB21. If controller 10 determines otherwise, controller 10 goes to SB27.

At SB27 controller 10 determines whether information has been received via remote control receiver 9 that is associated with a setting associated with brightness of a screen projected by lamp 16 in reproducing data which does not include image data. If controller 10 so determines, controller 10 goes to SB28 to receive a setting associated with the screen's brightness and furthermore stores the received setting value (any one of levels 1-5) to memory 6, and returns to SB21. If controller 10 determines otherwise, controller 10 simply returns to SB21.

Figure 9:
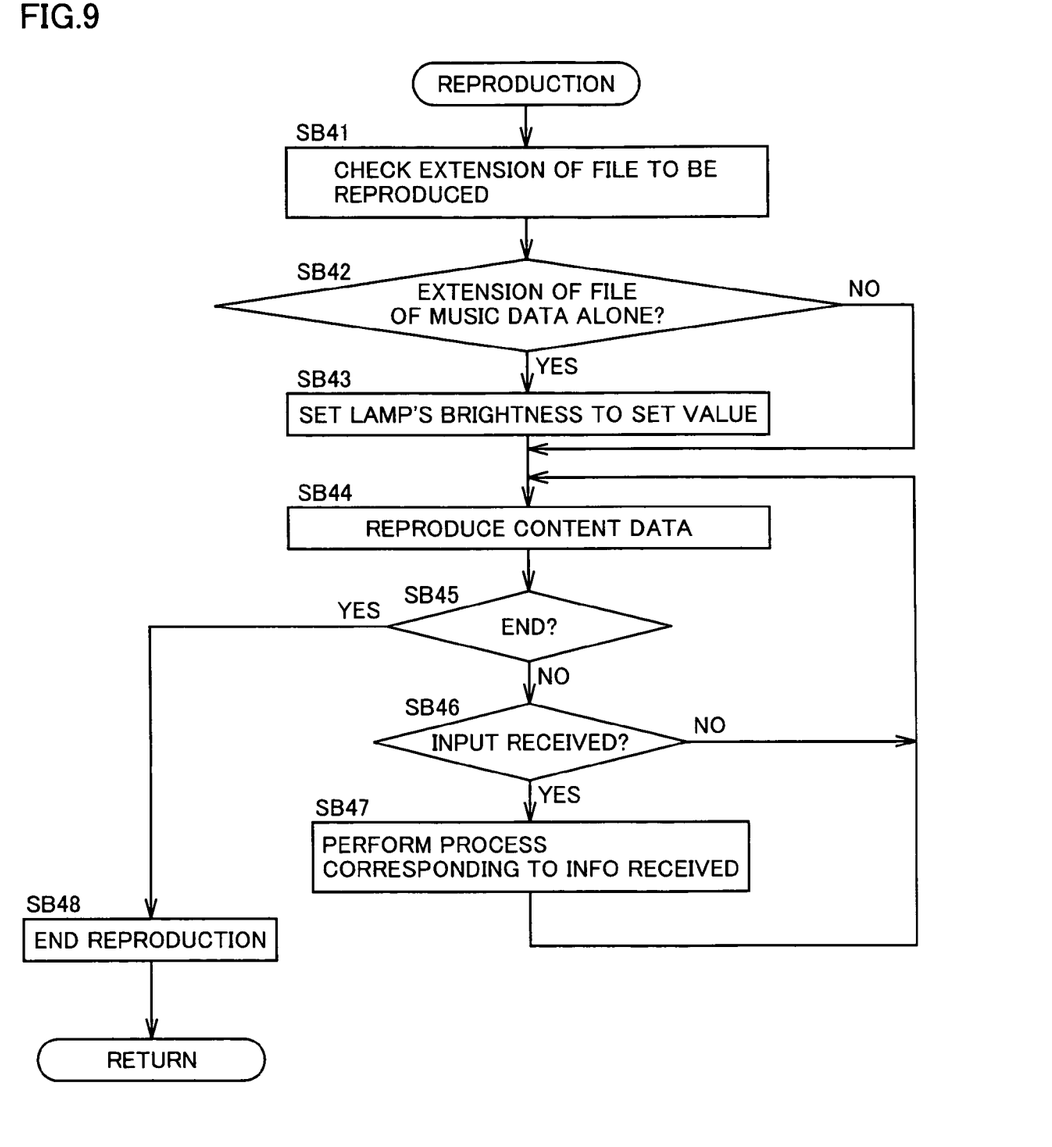
FIG. 9 is a flow chart of a subroutine in the FIG. 6 reproduction process.

Reference will now be made to FIG. 9 to specifically describe the FIG. 6 reproduction process.

With reference to FIG. 9, the reproduction process is performed as follows: controller 10 initially at SB41 checks an extension of a file to be reproduced and goes to SB42. Note that the file to be reproduced is designated by information included in that indicating that content should be reproduced, for the sake of illustration.

At SB42 controller 10 determines whether the extension of the file checked at SB41 is an extension of a file without an image output. More specifically, memory 6 has previously stored therein a list of extensions of files without an image output and controller 10 determines whether the extension of the file checked at SB41 matches any extension included in the list of extensions stored in memory 6. If controller 10 determines that the extension of the file checked at SB41 is an extension of a file without an image output, controller 10 goes to SB42, otherwise it goes to SB44.

At SB43 controller 10 sets lamp 16 in luminance to correspond to a setting of brightness set at SB28 and stored in memory 6, and then goes to SB44. Note that the luminance corresponding to the brightness set at SB28 is previously associated with memory 6 for the sake of illustration. Furthermore, of levels of brightness that can set at SB28, level 1 indicates that lamp 16 is controlled not to project anything. As such, if the above described brightness is set at level 1, controller 10 interrupts power supplied to lamp 16.

At SB44 controller 10 reproduces content data and goes to SB45. More specifically in the present embodiment if data which does not include image data is reproduced lamp 16 is initially adjusted in luminance and content data is then reproduced.

At SB45 controller 10 determines whether information that terminates reproducing the content data has been received via remote control receiver 9. If controller 10 so determines then controller 10 goes to SB48 to terminate reproducing the content data and then returns. Otherwise, controller 10 goes to SB46.

At SB46 controller 10 determines whether remote control receiver 9 has received any information. If so, controller 10 goes to SB47 to effect a process corresponding to the received information, and returns to SB44, otherwise controller 10 simply returns SB44.

Thus in the above described, present embodiment when storage media reproduction projector 20 reproduces data which does not include image data lamp 16 projects a screen with brightness set by a user to any of levels 1-5 and furthermore stored to memory 16. Thus projector 20 reproduces data which does not include image data lamp 16 is set in luminance to correspond to a set level of brightness (i.e., any of levels 1-5). Furthermore, if the brightness of interest is set to level 1, power supplied to lamp 16 can be interrupted to avoid wastefully supplying power to lamp 16 and thus increase the lamp's life.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A data reproduction apparatus reproducing an image and sound as based on data recorded in a storage medium, comprising:
    an input device receiving external information;
    a data selector selecting data to be reproduced from the data recorded in said storage medium;
    a determiner determining whether the data selected by said data selector is data excluding image data; and
    a controller capable of controlling in brightness an image reproduction device reproducing an image based on the data selected by said data selector, wherein when said input device has received predetermined information and said determiner determines that the data selected by said data selector is data excluding image data, said controller controls said image reproduction device to decrease its brightness for reproducing an image to be lower than when said determiner determines that the data selected by said data selector is data including image data.

2. The data reproduction apparatus according to claim 1, wherein said determiner determines from an extension of the data selected by said data selector whether the data selected by said data selector is data excluding image data.

3. The data reproduction apparatus according to claim 1, further comprising said image reproduction device.

4. The data reproduction apparatus according to claim 1, wherein when said input device receives predetermined information said determiner determines whether the data selected by said data selector is data excluding image data.

5. The data reproduction apparatus according to claim 4, wherein said controller depends on a frequency of reception of predetermined information by said input device to control said image reproduction device to gradually decrease its brightness for reproducing an image.

6. The data reproduction apparatus according to claim 1, further comprising a storage capable of storing information of whether said input device has received said predetermined information, wherein:
   said determiner determines in response to said data selector having selected data to be reproduced whether the data selected by said data selector is data excluding image data; and
   when said determiner determines that the data selected by said data selector is data excluding image data said controller refers to the information stored in said storage to determine whether said device should be decreased in brightness for reproducing an image.

7. The data reproduction apparatus according to claim 6, wherein:
   said storage stores information that said input device has received said predetermined information, and extent information indicating an extent of brightness reduced in said image reproduction device reproducing an image; and
   when said determiner determines that the data selected by said data selector is data excluding image data said controller controls said image reproduction device to decrease its brightness for reproducing an image, as based on said extent information.

8. The data reproduction apparatus according to claim 1, wherein:
   when said input device receives predetermined information said determiner determines from an extension of data selected by said data selector whether the data selected by said data selector is data excluding image data;
   said data apparatus further comprises said image reproduction device; and
   said controller depends on a frequency of reception of predetermined information by said input device to control said image reproduction device to gradually decrease its brightness for reproducing an image.

9. The data reproduction apparatus according to claim 1, wherein:
   said determiner operates in response to said data selector having selected data to be reproduced to determine from an extension of the data selected by said data selector whether the data selected by said selector is data excluding image data;
   said data reproduction apparatus further includes said image reproduction device, and a storage capable of storing information of whether said input device has received said predetermined information;
   said storage stores information that said input device has received said predetermined information, and extent information indicating an extent of brightness reduced in said image reproduction device reproducing an image; and
   when said determiner determines that the data selected by said data selector is data excluding image data, said controller refers to the information stored in said storage to determine whether said image reproduction device should be decreased in brightness for reproducing an image, and said controller also decreases said image reproduction device in brightness, by an extent based on said extent information, for reproducing the image.

10. A method of controlling a data reproduction apparatus reproducing an image and sound based on data recorded in a storage medium, comprising the steps of:
   receiving external information;
   selecting data to be reproduced from data recorded in said storage medium;
   determining whether the data selected to be reproduced is data excluding image data; and
   if predetermined information has externally been received and a decision is made that the data selected to be reproduced is data excluding image data, controlling said image reproduction device to have a lower level in brightness for reproducing an image than when a decision is made that the data selected to be reproduced is data including image data.

* * * * *